United States Patent [19]

Fujii

[11] 3,719,738

[45] March 6, 1973

[54] METHOD FOR PRODUCING COMPOSITE FIBERS OF ACRYLONITRILE TYPE

[75] Inventor: Makoto Fujii, Fujishi, Japan

[73] Assignee: Ash Kasei Kogyo Kabushiki Kaisha, Kitaku, Osaka, Japan

[22] Filed: April 28, 1969

[21] Appl. No.: 819,736

[30] Foreign Application Priority Data

May 8, 1968 Japan..................................43/30246

[52] U.S. Cl. .................264/171, 161/173, 264/168, 264/182
[51] Int. Cl. ..............................................B29f 3/10
[58] Field of Search .......264/171, 182, 168; 161/173

[56] References Cited

UNITED STATES PATENTS

| | | | |
|---|---|---|---|
| 3,562,378 | 2/1971 | Fujita et al. | 264/171 |
| 3,547,763 | 12/1970 | Hoffman | 161/173 |
| 3,400,531 | 9/1968 | Ohfuka et al. | 57/140 |

FOREIGN PATENTS OR APPLICATIONS

| | | | |
|---|---|---|---|
| 796,220 | 10/1968 | Canada | 264/171 |
| 42/27584 | 12/1967 | Japan | 264/171 |
| 43/19117 | 8/1968 | Japan | 264/171 |
| 44/26410 | 11/1969 | Japan | 264/171 |
| 480,454 | 12/1969 | Switzerland | 264/171 |
| 3,400,531 | 9/1968 | | |

Primary Examiner—Jay H. Woo
Attorney—Fred C. Philpitt

[57] ABSTRACT

Method for producing composite fibers of acrylonitrile type having excellent properties which comprises mixing a three component copolymer A consisting of acrylonitrile, methyl acrylate or methyl methacrylate and methallyl sulfonic acid, which satisfies specified conditions and a four component copolymer B consisting of acrylonitrile, methyl acrylate or methyl methacrylate, acryl amide and methallyl sulfonic acid, which satisfies specified conditions in such a proportion that the copolymer A occupies 25 to 75 percent by weight in the resultant copolymer mixture C and extruding the copolymer A and the copolymer mixture C from a common spinneret so as to form composite fibers having an eccentric arrangement (side by side or sheath and core arrangement) in the cross section by using a nitric acid type solvent.

5 Claims, 1 Drawing Figure

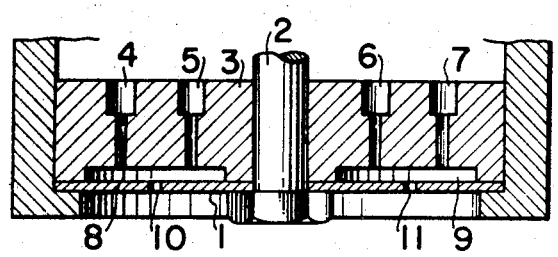

METHOD FOR PRODUCING COMPOSITE FIBERS OF ACRYLONITRILE TYPE

This invention relates to a method for producing composite fibers of acrylonitrile type, and particularly to composite fibers having excellent properties.

The production of composite fibers having wool-like three-dimensional crimp by a process comprising joining together two or more thermoplastic materials having different shrinkages in sheath and core or side by side relation, has been known by U.S. Pat. No. 2,439,815 assigned to American Viscose Corporation, Japanese Patent publication No. 1024/1963 assigned to E. I. Du Pont Nemours and Co. etc.

However, it has not been possible to obtain composite fibers having sufficient commercial value by using a known process and a known combination of polymers in the wet spinning of acrylonitrile type polymer which uses a nitric acid type solvent. Namely, the composite fibers produced by a conventional method are not always satisfactory in anti-pilling property and deepness of developed colors in dyeing which are considered to be important properties for the evaluation of commercial products.

The invention of Japanese Patent publication No. 9095/1967 assigned to Asahi Kasei Kogyo Kabushiki Kaisha relating to a method for producing composite fibers having a specified component consisting of acrylonitrile, methyl acrylate or methyl methacrylate and methallyl sulfonic acid or sulfoalcohol ester of methacrylic acid and another specified component consisting of acrylonitrile, methyl acrylate or methyl methacrylate, acryl amide and sulfoalcohol ester of methacrylic acid by using a nitric acid type solvent, has solved the above-mentioned problems.

The present invention has its object in providing a method for producing composite fibers having further improved properties in addition to those obtained in the above-mentioned prior invention. More particularly, an object of the present invention is to provide a novel method for producing composite fibers having less tendency of fluff forming and fibrillated fiber forming, large loop tenacity and elongation; soft handle and excellent resilience.

By virtue of my studies in order to obtain far superior composite fibers in a wet spinning process by using a nitric acid type solvent, I have now found that composite fibers having surprisingly superior properties and higher commercial value can be obtained by the method of which will be given hereafter.

According to the method of the present invention, a three component copolymer A consisting of acrylonitrile, methyl acrylate or methyl methacrylate and methallyl sulfonic acid which satisfies the relations expressed by equations of $$v + 2.1 w - 18.23 < 0 \quad (1)$$
$$v + w - 7.95 > 0 \quad (2)$$
$$v + 0.02 w - 0.55 > 0 \quad (3) \text{ and}$$
$$v + 0.01 w - 0.674 < 0 \quad (4)$$

(wherein $v$ is weight percent of methallyl sulfonic acid and $w$ is weight percent of methyl acrylate or methyl methacrylate both in the three component polymer A.), and a four component copolymer B consisting of acrylonitrile, methyl acrylate or methyl methacrylate, acryl amide and methallyl sulfonic acid, which satisfies the relations expressed by equations of $$x + 1.75 y - 19.45 < 0 \quad (5)$$
$$x + 3.3 y - 28.63 > 0 \quad (6)$$
$$x + 0.0208 y - 0.4288 > 0 \quad (7)$$
$$x + 0.013 y - 0.6904 < 0 \quad (8)$$
$$t + u = y \quad (9)$$
$$u \geq 2 \quad (10) \text{ and}$$
$$x \leq v \quad (11)$$

(wherein $x$ is weight percent of methallyl sulfonic acid, $y$ is a sum of weight percents of methyl acrylate or methyl methacrylate and acryl amide, $t$ is weight percent of methyl acrylate or methyl methacrylate, and $u$ is weight percent of acrylamide, all based upon the weight of the four component copolymer B ), are mixed to give a copolymer mixture C in which the copolymer A occupies a proportion ranging from 25 to 70 percent by weight of said copolymer mixture C and whose composition falls within the range specified for the composition of the copolymer B, and the copolymer A and the copolymer mixture C are extruded from a common spinneret by using a nitric acid type solvent so as to form composite fibers having cross-section arranged in eccentric, (sheath and core or side by side) relation. Resultant composite fibers are subjected to washing with water, stretching, drying, heat treatment at 100°–150° C, further stretching 1.1 – 1.5 times the original length and further heat treatment for relaxation.

The method of the present invention has two important features. One of the features consists in the use of a copolymer mixture as one joining component among two joining components. The composite fibers thus produced have properties much superior to those obtained simply by joining the copolymer A and the copolymer B in that the forming of fluff is noticeably less, the forming of fibrillated fibers is considerably reduced and loop tenacity and elongation are further increased. It goes without saying that the improvement of these properties is an indispensably important factor for elevating the commercial value of fibers.

The reasons for the above-mentioned improvement are not exactly known but it is believed, as one of the reasons, that when a copolymer mixture C having the above-defined range is used as one of the joining components in the wet spinning in which a nitric acid type solvent is employed, the spinnability of the resultant composite fibers is improved and especially the allowable stretch ratio at the time of spinning is elevated and thus fibers superior in the above-mentioned characteristics can be obtained after undergoing the steps of drying and wet heat treatments.

Another of the important features of the present invention is that when the composite fibers obtained by the present method are subjected to washing with water, stretching and drying, then to dry or wet heat treatment at 100° – 150° C, further stretching 1.1 – 1.5 times the original length on heating at 110°–170° C and then to relaxation heat-treatment at 100° – 170° C, products superior in elasticity, soft in handle, less stained and high in commercial value can be obtained, in addition to the improved characteristics disclosed in the preceding paragraph.

I will hereinafter set forth the reasons why both copolymers A and B are defined as above-mentioned, why a copolymer mixture is used as one joining component and why the proportion of the copolymer A in the copolymer mixture C is made to be in the range of 25 to 75 percent by weight.

When the compositions of both the copolymers A and B do not fall within the ranges defined by the equations (1) to (11), or when vinyl chloride, vinyl acetate, vinylidene chloride, styrene or the like is used instead of methyl acrylate or methyl methacrylate, even provided that the conditions defined by the above-mentioned equations be satisfied, satisfactory composite fibers cannot be obtained with regard to anti-pilling properties, dyeability, joinability of the two components, etc. Further, when a monomer containing a sulfonic acid group other than methallyl sulfonic acid is used, satisfactory result cannot be obtained, particularly with regard to dyeability.

1. With regard to each of the copolymer components A and B
   1. When the equations (1) and (5) are not satisfied, excessive natural crimps are produced. On this account, handle becomes worse and coarser, moreover shrinkage becomes too high and superior commercial products cannot be obtained.
   2. When the equations (2) and (6) are not satisfied, the handle of resultant fibers becomes stiff and often fibrillated fibers are produced.
   3. When the equations (3) and/or (7) are not satisfied, color tone becomes worse and often dyeing specks appear.
   4. When equations (4) and/or (8) are not satisfied, stretchability at the time of spinning becomes worse and tensile-, loop- and knot-strengths and elongations are reduced.
   5. When either one of the equations (1) and (5) is not satisfied, in some cases too many natural crimps are created in the composite fibers and pilling becomes excessive or in other cases on the contrary, numbers of natural crimps become too low. In either case, only products of inferior handle can be obtained.
   6. When either one of the equations (2) and (6) is not satisfied, in some cases, too many natural crimps are created, pilling is liable to be formed or in other cases on the contrary, numbers of natural crimps become too small as in the preceding case. In either case, only products of inferior handle can be obtained.
   7. When the equation (10) is not satisfied, the crimping power of resultant natural crimps is reduced and the elasticity of commercial products produced by these composite fibers is thereby reduced.
   8. When the equation (11) is not satisfied, the color developing property after dyeing is poor and often dyeing specks appear.
2. It is a feature of the present method that a copolymer mixture C is used as one component of the composite fibers and said copolymer mixture C is prepared in such a way that the copolymer A occupies 25 to 75 percent by weight of said copolymer mixture C but if this mixing ratio is not in the above-defined range, the above-mentioned advantages regarding the use of the copolymer mixture C cannot be obtained.

Further, if the composition of the copolymer mixture C is outside the range defined for the copolymer B, the drawbacks exerted by the polymer B upon the composite fiber system described in Article 1 above are also exerted upon the system of the copolymer mixture C.

Each of the copolymers A and B which constitute composite fibers having a copolymer mixture as one component thereof, can be polymerized by a known process. For example, it can be polymerized in water or a solvent of an organic compound by the use of 2,2'-azobisisobutyronitrile, benzoyl peroxide or hydroxynitrile-sulfonic acid – acid sulfite, etc. as a polymerization initiator in the emulsion, suspension or solution polymerization process.

Suitable polymerization temperature is usually in the range of 0° C to 70° C. Any continuous or semicontinuous polymerization processes can be utilized. Further a polymerization assistant such as mercaptane or the like may be added.

Methallyl sulfonic acid can be used in the form of its salt.

As aqueous solution of concentrated nitric acid, purified aqueous solution of nitric acid from which nitrous acid is eliminated as much as possible is used as a solvent in the method of the present invention.

The concentration of nitric acid is usually in the range of 66–75 percent by weight. By the use of the nitric acid having such a concentration, acrylic type polymers are dissolved.

Further, as a coagulation bath, the above-mentioned purified aqueous solution of nitric acid having a concentration of 28 – 40 percent by weight is used. It is preferable that the purified nitric acid is used at a temperature lower than 0° C both in case of its use as a solvent and a coagulant. As for the joining proportion of the components of the copolymers A and C, the proportions of 40/60 – 60/40 are preferable.

One accompanying drawing of the present specification shows schematic view of a vertical cross section of one example of a spinneret that can be used in the practice of the present invention. For the sake of clarity, only the principle will be described.

The surface plate 1 of the spinneret is tightly fastened to the base 3 of the spinneret lying at its back by a bolt 2.

Two kinds of spinning solutions each containing different polymers are introduced into spaces 4 and 7; and spaces 5 and 6, respectively. The spinning solutions of 4 and 5 are sent to a space 8 and the spinning solutions of 6 and 7 to a space 9 and extruded from spinning holes 10 and 11, respectively into an outside coagulation bath to form the shape of composite fibers. At this time, there are filled in the outside part of the spaces 8 and 9, the spinning solution sent from the spaces 4 and 7 and in the inside part of the spaces 8 and 9, the spinning solution sent from the spaces 5 and 6, and when both the spinning solutions are extruded from the hole 10 or 11, they are joined as if joined in bimetal to form a composite fiber filament. Needless to say, it is possible to make composite fibers having a sheath and core construction by changing the spinneret. It is also possible to make the cross-section of fibers have any given shape such as circular, flat or other shape. Even in case of bimetal type, the cross-section of composite fibers may often take a sandwich shape to a certain extent.

Following examples are offered by way of illustration of the present invention and the effectiveness thereof but it is to be understood that they are not offered by way of limitation. All percents and ratios are by weight.

Example 1

A copolymer A consisting of 91.2 percent of acrylonitrile, 8.3 percent of methyl acrylate and 0.5 percent of sodium methallylsulfonate and a copolymer B consisting of 90.3 percent of acrylonitrile, 2.9 percent of methyl acrylate, 6.5 percent of acrylamide and 0.3 percent of sodium methallylsulfonate are, respectively dissolved in 65 percent aqueous solution of nitric acid at 0° C to prepare spinning solutions each having a viscosity of 800 poise. These two kinds of spinning solutions were extruded from a common spinneret in a coagulation bath of 30 percent aqueous solution of nitric acid at 0° C and at a joining proportion of the two polymer components of 1:1 to produce composite fibers which was then subjected to water washing, stretching, drying and then to wet heat treatment at 110° C. (Resultant composite fibers will be referred to as α composite fibers.)

Further the above-mentioned copolymer A and copolymer C consisting of 90.75 percent of acrylonitrile, 5.6 percent of methyl acrylate, 3.25 percent of acyl amide and 0.4 percent of sodium methallyl sulfonate, which was obtained by blending the copolymer A and the copolymer B in the proportion of A:B of 50:50, were likewise subjected to composite spinning with a joining rate of 1:1, and after the same steps of treatments as in the precedent case of α composite fibers were produced. (Resultant composite fibers will be referred to hereinafter as β composite fibers.)

Each of the resultant composite fibers was cut in bias into fibers having a length of 64 – 127 mm to prepare spun yarns of 2/36 Nm (metric number of yarn), and the physical properties of filaments and the quality of the spun yarns were compared. Results of the comparison are shown in following table. The β composite fibers were superior to the α composite fibers.

| monofilament | α composite fibers (comparative example) | β composite fibers (example of this invention) |
|---|---|---|
| denier | 3.0 d | 3.0 d |
| dry tenacity | 2.7 g/d | 2.8 g/d |
| dry elongation | 36% | 43% |
| loop tenacity | 2.4 g/d | 3.4 g/d |
| loop elongation | 30% | 41% |
| forming of fibrillated fibers | many to some extent | few |
| fluff of the spun yarns | many to some extent | few |

EXAMPLE 2

Copolymers A and B having the following compositions were prepared respectively, and a copolymer mixture C was then prepared by blending the copolymers A and B in various mixing ratios of A/B. The copolymer A and the polymer mixture C were, respectively dissolved in 70 percent aqueous solution of nitric acid to give spinning solutions having 800 to 900 poise. The resultant spinning solutions were subjected to composite-spinning by extruding them in 30 percent aqueous solution of nitric acid with a joining ratio of 1:1, and the resultant filaments were subjected to water washing, stretching, drying, wet heat treatment at 120° C., and processing with a turbo-stapler. Thus, spun yarns having 2/48 Nm and filaments of 3-denier were prepared. Principal conditions of the above-mentioned procedure and physical properties of resultant composite fibers are shown in the following Table.

| | Examples of this invention | | Comparative example |
|---|---|---|---|
| Composition of copolymer A (percent) | AN/AM/AA/MSS 91.2/8.4/—/0.4 | AN/AM/AA/MSS 91.2/8.4/—/0.4 | AN/AM/AA/MSS 91.2/8.4/—/0.4 |
| Composition of copolymer B (percent) | AN/AM/AA/MSS 89.6/5/5/0.4 | AN/AM/AA/MSS 90.3/6.0/3.3/0.4 | AN/AM/AA/MSS 90.6/5.8/3.2/0.4 |
| Mixing ratio of A/B | 50/50 | 25/75 | 20/80 |
| Composition of polymer mixture C (percent) | AN/AM/AA/MSS 90.4/6.7/2.5/0.4 | AN/AM/AA/MSS 90.5/6.6/2.5/0.4 | AN/AM/AA/MSS 90.3/6.7/2.6/0.4 |
| Symbol of composite fibers | γ composite fibers | δ composite fibers | ε composite fibers |
| Maximal stretching ratio (times) | 12.8 | 11.0 | 6.3 |
| Denier (d) | 3.0 | 3.0 | 3.0 |
| Dry tenacity (g/d) | 2.9 | 2.6 | 1.7 |
| Dry elongation (%) | 41 | 36 | 24 |
| Loop tenacity (g/d) | 3.0 | 2.8 | 1.4 |
| Loop elongation (%) | 39 | 35 | 19 |
| Turbofly (g/kg) | 0.4 | 1.1 | 5.9 |
| Fluff | few | few | many to some extent |
| Handle | soft and good | soft and good | stiff and coarse |

AN: Acrylonitrile, AM: Methyl acrylate, AA: Acryl amide MSS: Sodium methallysulfonate (These abbreviations are used in the following Examples.)

As apparent from the above-mentioned results, the composite fibers according to the present invention are much superior.

EXAMPLE 3

Copolymers A and B having the following compositions were prepared respectively, and then a copolymer mixture C was prepared by blending the copolymers A and B in various mixing ratios of A/B. The copolymer A and the polymer mixture C were, respectively dissolved in 65 percent aqueous solution of nitric acid to give spinning solutions having 800 to 900 poise. The resultant spinning solutions were subjected to composite-spinning by extruding them in 30 percent aqueous solution of nitric acid with a joining ratio of 1:1. The resultant filaments were subjected to water washing, stretching, drying, wet heat treatment at 125° C, and cut in bias to fibers of filaments of 3d having length of from 70 to 130 mm. Thus, spun yarns of 2/48 Nm were produced.

Each principal physical properties are shown in the following Table.

|  | Comparative example AN/AM/AA/MSS | Example of this invention AN/AM/AA/MSS |
|---|---|---|
| Composition of copolymer A(%) | 91.1/8.4/-/0.5 | 91.1/8.4/-/0.5 |
| Composition of copolymer B(%) | 89.5/-/10/0.5 | 89.8/2.7/7/0.5 |
| Mixing ratio of A/B | 80/20 | 70/30 |
| Composition of polymer mixture C(%) | 90.8/6.7/2/0.5 | 90.7/6.7/2.1/0.5 |
| Symbol of composite fibers | ρ composite fibers | η composite fibers |
| Maximal stetching ratio (times) | 6.7 | 11.2 |
| Dry tenacity(g/d) | 1.9 | 2.9 |
| Dry elongation(%) | 23 | 40 |
| Loop tenacity(g/d) | 1.4 | 3.1 |
| Loop elongation(%) | 17 | 36 |
| Carding fly | many | few |
| Fluff | many | few |
| Handle | stiff and grazing | soft and good |

As apparent from the above-mentioned results, the composite fibers of the present invention are much superior.

COMPARATIVE EXAMPLE 1

Copolymers A and B having the following compositions were prepared, and mixed in a ratio of A/B of 50/50 to give a polymer mixture C. The copolymer A and the polymer mixture C were, respectively dissolved in 68% aqueous solution of nitric acid at $-2°$ C to give spinning solution having 700–800 poise. These spinning solutions were subjected to composite-spinning by extruding them in 30 percent aqueous solution of nitric acid through a spinneret having 10,000 holes of 0.08 mm$\phi$ diameter. The resultant filaments were subjected to water washing, stretching, drying, and wet heat treatment at 120° C. Thus, composite fibers consisting of 3 denier monofilaments were prepared. These composite fibers were compared with β composite fibers produced in Example 1 (according to the method of the present invention).

Particularly inferior points are listed as follows:

COMPOSITIONS OF COPOLYMERS AND POLYMER MIXTURES

| | Composition of copolymer A (percent) | | | Composition of copolymer B (percent) | | | | Composition of polymer mixture C (percent) | | | | Unsatisfied equations among those of (1) to (11) |
|---|---|---|---|---|---|---|---|---|---|---|---|---|
| | AN | AM | MSS | AN | AM | AA | MSS | AN | AM | AA | MSS | |
| θ Composite fibers | 89.5 | 10 | 0.5 | 87.5 | 6 | 6 | 0.5 | 89.0 | 8 | 3 | 0.5 | >(1), >(5). |
| ι Composite fibers | 93.5 | 6 | 0.5 | 87.5 | 6 | 6 | 0.5 | 90.5 | 6 | 3 | 0.5 | <(2), >(5). |
| κ Composite fibers | 91.5 | 8 | 0.5 | 87.5 | 6 | 6 | 0.5 | 89.5 | 7 | 3 | 0.5 | >(5). |
| λ Composite fibers | 93.5 | 6 | 0.5 | 91.5 | 2 | 6 | 0.5 | 92.5 | 4 | 3 | 0.5 | <(2), <(6). |
| μ Composite fibers | 91.7 | 8 | 0.3 | 87.8 | 6 | 4 | 0.2 | 90.75 | 7 | 2 | 0.25 | <(3), <(7). |
| ν Composite fibers | 91.5 | 8 | 0.5 | 89.8 | 3 | 7 | 0.2 | 90.65 | 5.5 | 3.5 | 0.35 | <(7). |
| ξ Composite fibers | 91.0 | 8 | 1.0 | 89.2 | 6 | 4 | 0.8 | 90.1 | 7 | 2 | 0.9 | >(8). |
| o Composite fibers | 91.6 | 8 | 0.4 | 89.5 | 3 | 7 | 0.5 | 90.55 | 5.5 | 3.5 | 0.45 | $x<v$ at (11). |
| π Composite fibers | 91.5 | 8 | 0.5 | 89.5 | 8 | 2 | 0.5 | 90.5 | 8 | 1 | 0.5 | $u<z$ at (10). |

Results of comparisons with β composite fibers:

κ and ε composite fibers:
 (1) Too much natural crimps occurred in the step of producing raw fibers, and uniform slivers were not formed.
 (2) Sweater was made from spun yarns of 2/36 Nm, and it was subjected to dimensional stability test by washing. As a result, it was remarkably loose and sagging compared with the sweater made from β composite fibers.

ι composite fibers:
 (1) Knitted fabric was very stiff due to too much difference of heat shrinkage between the components A and C, and too small crimps of the composite fibers.
 (2) It was difficult to produce fibers having uniform, natural crimps, with good reproducibility.

λ composite fibers (comparisons of data of physical properties):

| Composite fibers | Denier (d.) | Maximal stretching ratio (times) | Dry tenacity (g./d.) | Dry elongation (percent) | Loop tenacity (g./d.) | Loop elongation (percent) | Percentage of exhaustion for one hour (percent) | Phenomena of fibrillation |
|---|---|---|---|---|---|---|---|---|
| λ | 3 | 6.7 | 1.8 | 24 | 1.1 | 21 | 43 | Remarkable. |
| β | 3 | 12.1 | 2.8 | 43 | 3.4 | 41 | 53 | No. |

μ and ν composite fibers:
The percentages of exhaustion of these composite fibers for one hour were compared with that of β composite fibers:

| | Percent |
|---|---|
| β composite fibers | 53 |
| μ composite fibers | 39 |
| ν composite fibers | 41 |

μ and ν composite fibers were poor in deepness of dyeing degree. This resulted in a marked inferiority of commercial value. Further, dyeing specks occurred to a certain extent.

ξ composite fibers:
Comparisons of data of spinning and physical properties of raw staple fibers:

| Composite fibers | Maximal stretching ratio (times) | Dry tenacity (g./d.) | Dry elongation (percent) | Loop tenacity (g./d.) | Loop elongation (percent) |
|---|---|---|---|---|---|
| ξ | 7.0 | 2.1 | 31 | 1.8 | 27 |
| β | 12.1 | 2.8 | 43 | 3.4 | 41 | o composite fibers:
Dyed staple fibers had dying specks (i.e. pepper-and-salt like, not yet dyed parts), and their commercial value was very few.

π composite fibers:
Bias-cut fibers of β and π composite fibers were respectively dyed by means of Overmaier dyeing machine and spun into spun yarns of 2/36 Nm. They were bulked by heat treatment at 100° C. for 30 minutes. The shrinkage percentage and curliness of each spun yarn due to the creation of crimps after bulked were as follows:

| Composite fibers | Shrinking percentage ($S_{200}^{10}$) | Curliness percentage ($Z_{200}^{10}$) |
|---|---|---|
| π | 7 | 4.5 |
| β | 22 | 17 |

As apparent from the above-mentioned results of comparison, it can be clearly seen that when the composition of composite fibers is out of the range defined in the present invention, the physical properties of the resultant composite fibers degrade.

EXAMPLE 4

A copolymer A consisting of 91.1 percent of acrylonitrile, 8.4 percent of methyl acrylate and 0.5 percent of sodium methallyl sulfonate, and a copolymer B consisting of 90.1 percent of acrylonitrile, 2.8 percent of methyl acrylate, 6.6 percent of acryl amide and 0.5 percent of sodium methallyl sulfonate were, respectively, dissolved in 65 percent aqueous solution of nitric acid containing 0.0005 percent of nitrous acid at 0° C to give spinning solutions having each a viscosity of 800 poise. These spinning solutions were subjected to composite spinning with a joining proportion of 1:1 by extruding them into 33 percent aqueous solution of nitric acid at 0° C through a spinneret having 10,000 holes of 0.08 mm diameter and the resultant filaments were washed with water, stretched, dried and then subjected to wet heat treatment in the atmosphere of steam at 110° C (Resultant composite fibers will be referred to as $\rho$ composite fibers).

Further the above-mentioned copolymer A and a copolymer C obtained by blending the copolymer A and the copolymer B in the proportion of A:B of 50:50 and containing 90.6 percent of acrylonitrile, 5.6 percent of methyl acrylate, 3.3 percent of acrylamide and 0.5 percent of sodium methallyl sulfonate, were subjected to composite spinning with a joining ratio of 1:1 and the resultant filaments were subjected likewise to wet heat treatment in the atmosphere of steam at 110° C after water-washing, stretching and drying (Resultant composite fibers will be referred to as $\sigma$ composite fibers)

The $\sigma$ composite fibers were stretched 1,29 times the original length under dry heating at 97° C and subjected to relaxation heat treatment at 105° C (Resultant composite fibers will be referred to $\tau$ composite fibers).

These composite fibers were cut in bias to fibers having length of from 64 to 127 and spun yarns of 2/36 Nm were produced from cut fibers.

Results of comparison of properties made between each composite fiber and the spun yarns are shown in the following table.

| | Comparative example $\rho$ composite fibers | Examples of the present invention $\sigma$ composite fibers | $\tau$ composite fibers |
|---|---|---|---|
| denier(d) | 2.9 | 3.1 | 2.9 |
| dry tenacity(g/d) | 2.8 | 2.7 | 2.9 |
| dry elongation(%) | 35 | 40 | 44 |
| loop tenacity(g/d) | 2.7 | 2.6 | 2.9 |
| loop elongation(%) | 30 | 36 | 41 |
| fibrillation | many | few | few |
| fluff of spun yarns | many to some extent | few | few |
| bulkiness (cm) | 10.5 | 7.2 | 10.7 |

Apparent from the above-comparison, the composite fibers of the present invention are much superior.

The measurement of loop tenacity, elongation, elastic repulsion, handle, shrinking percentage $S_{200}^{10}$ and curliness $Z_{200}^{10}$ of the composite fibers of the present invention were made in accordance with the following methods Loop tenacity: JIS L-1069-1964 Tensile Strength Tests of Fibers Elastic repulsive force: 100 g. of composite fibers (cut fibers) was charged in a measuring cylinder having about 8.3 cm of diameter, the height $e$ cm one minute after putting an initial load of 100 g, then the height $f$ cm one minute after putting a load of 1000 g and then the height $g$ cm one minute after returning the load to the initial value, were measured, respectively and the height of $g$ cm was made as a measure of bulkiness and elastic repulsive force.

Handle: Conclusion made by the criticism and judgement of 13 experts.

Shrinking %:

$$s_{200}{}^{10} : S_{200}{}^{10} = (l_{200} - l_{10}')/l_{200} \times 100 \, (\%)$$

Curliness $$z_{200}{}^{10} : Z_{200}{}^{10} = (l_{200}' - l_{10}')/l_{200}' \times 100 \, (\%)$$

where $l_{200}$ is a length of fiber under a load of 200 mg/d before heat treatment. $l_{10}'$ is a length of fiber under a load of 10 mg/d after heat treatment, and $l_{200}'$ is a length of fiber under a load of 200 mg/d after heat treatment.

TRANSLATION OF JISL-1069-1964

(abstract)

Standard condition of test room:
 temperature, 20±2° C; relative humidity 65±2 percent;

Preparation of specimen:
 Section lines (space distance is 20 mm, but when fibers are too short, it can be 10 mm) are prepared as in FIG. 1 on a suitable strip of paper. Each one fiber is placed in each section at loosely spun state and both the ends are fixed by an adhesive.

In case of knot-strength and loop strength, preliminary prepared knots and loops are placed in the middle of the section.

Number of test: Normally 30

Testing method:
 A monofilament specimen is gripped with the grips of a yarn tensile strength tester and the strip of paper is broken near the upper grip. After removing relaxation and curl by an initial load, tests are carried out by one of the following conditions. Strengths ($g$) and elongation ($mm$) at break are measured.

Calculation:
 Mean values of strengths at break are calculated and expressed by $g$ per exact denier (down to two places of decimals). Elongations are expressed by percent of elongation at break (or elongation at maximum strength) relative to the length of fibers between the grips.

| Kind of tester | distance between the grips | pulling speed |
|---|---|---|
| Constant rate of traverse | 20 mm | 20±/mm/min |

| | | |
|---|---|---|
| Constant rate of load | 20 mm | loading velocity by which total capacity is loaded in one minute |
| Constant rate of specimen extention | 20 mm | Elongation speed of about 100% or about 50% of the distance between grips per one minute. |

Loop strength

Standard time: Under the above-mentioned conditions, gripping is carried out in such a way that loops comes to the middle point of the grips. Loop strengths ($g$) are measured and expressed by their mean values.

Wet time: Specimens are placed in a vessel, and immersed for a prescribed time* in distilled water ($20\pm2°A$ C). After sufficiently wetted, loop strengths ($g$) are measured as in the standard time.

* time of immersion: More than one minute for silk, wool, rayon, acetate fibers and more than three minutes for cotton, hemp and synthetic fibers.

What is claimed is:

1. A method for producing acrylonitrile-type composite fibers which comprises:
   A. forming a copolymer mixture C by mixing a three component copolymer A with a four component copolymer B,
   a. said three component copolymer A consisting of a combination of:
      $a_1$. acrylonitrile,
      $a_2$. methyl acrylate or methyl methacrylate and
      $a_3$. methallyl sulfonic acid or sodium methallyl sulfonate
   the weight percentages of said three components being such that they satisfy the conditions given by the equations:

$$v + 2.1 w - 18.23 < 0 \quad (1)$$
   $$v + w - 7.95 > 0 \quad (2)$$
   $$v + 0.02 w - 0.55 > 0 \quad (3)$$ and
   $$v + 0.01 w - 0.674 < 0 \quad (4)$$

(wherein $v$ is percent by weight of methallyl sulfonic acid and $w$ is percent by weight of methyl acrylate or methyl methacrylate respectively in the copolymer A, the remainder being acrylonitrile)
   b. said four component copolymer B consisting of:
      $b_1$. acrylonitrile,
      $b_2$. methylacrylate or methyl methacrylate,
      $b_3$. acryl amide, and
      $b_4$. methallyl sulfonic acid or sodium methallyl sulfonate,
   the weight percentages of said four components satisfying the conditions given by the equations:

$$x + 1.75 y - 19.45 < 0 \quad (5)$$
   $$x + 3.3 y - 28.63 > 0 \quad (6)$$
   $$x + 0.0208 y - 0.4288 > 0 \quad (7)$$
   $$x + 0.013 y - 0.6904 < 0 \quad (8)$$
   $$t + u = y \quad (9)$$
   $$u \geq 2 \quad (10)$$
   $$x \leq v \quad (11)$$

(wherein $x$ is percent by weight of methallyl sulfonic acid, $y$ is a sum of percent by weight of methyl acrylate or methyl methacrylate and percent by weight of acryl amide, $t$ is percent by weight of methyl acrylate or methyl methacrylate, and $u$ is percent by weight of acryl amide, respectively in the copolymer B; the remainder being acrylonitrile).
   c. the proportion of copolymer A comprising 25 to 75 percent by weight of the copolymer mixture C,
   d. the composition of said copolymer mixture C falling within the weight percentages satisfying the conditions set forth in the equations above for the composition of copolymer B,
   B. dissolving separately said copolymer A and said copolymer mixture C in a nitric acid type solvent and extruding the resulting solutions through a spinneret, to thereby produce composite fibers having an eccentric arrangement when considered in cross section.

2. The method according to claim 1 wherein the formed composite fibers are thereafter subjected to washing, stretching, drying, a first heat treatment, stretching by 1.1 to 1.5 times, and then a second heat treatment.

3. A method according to claim 2 wherein said first heat treatment is carried out at a temperature in the range of 100° – 150° C.

4. A method according to claim 1 wherein the nitric acid type solvent is 66 to 75% nitric acid freed of nitrous acid as much as possible and the extrusion of copolymer A and copolymer mixture C is carried out into a coagulation bath of 28% to 40% nitric acid freed of nitrous acid as much as possible.

5. A method according to claim 1 wherein the relative proportions of copolymer A and copolymer mixture C in the composite fibers is within the range of 40/60 to 60/40.

* * * * *